Feb. 13, 1934.  L. A. MACKLANBURG  1,947,352
WEATHER STRIPPING
Filed Aug. 29, 1932

Inventor
Louis A. Macklanburg
By Mason Fenwick & Lawrence
Attorneys

Patented Feb. 13, 1934

1,947,352

UNITED STATES PATENT OFFICE 1,947,352

WEATHER STRIPPING

Louis A. Macklanburg, Oklahoma City, Okla.

Application August 29, 1932. Serial No. 630,922

2 Claims. (Cl. 20—69)

This invention relates to weather stripping and more particularly to metal weather stripping.

The object of the invention is to provide an improved metal weather stripping of the type characterized by having a marginal part of an elongated strip adapted to be secured to a window or door frame or the like while the opposite marginal part is provided with a slide or contact face, the intermediate part of the strip forming a resilient or spring tension part adapted to force the contact face into engagement with the door or sash member. In weather stripping of the type generally indicated it is usual to secure the strip by the use of spaced brads driven through the marginal securing part and such strips have many advantages and are extensively used. However, it has been found in use that there is a marked tendency in such strips, when flexed, to bow slightly intermediate the securing brads the central part of the marginal securing edge, lifting intermediate the securing brads, and thus permitting passage of air between the weather strip and the frame structure to which it is attached. To eliminate this bowing or flexing of the marginal securing part of the weather strip intermediate the securing brads is the object of the present invention.

The invention consists in the novel construction, arrangement and combinations of parts hereinafter more particularly described and claimed.

One sheet of drawing accompanies this specification as part thereof in which like reference characters indicate like parts throughout.

Figure 1:
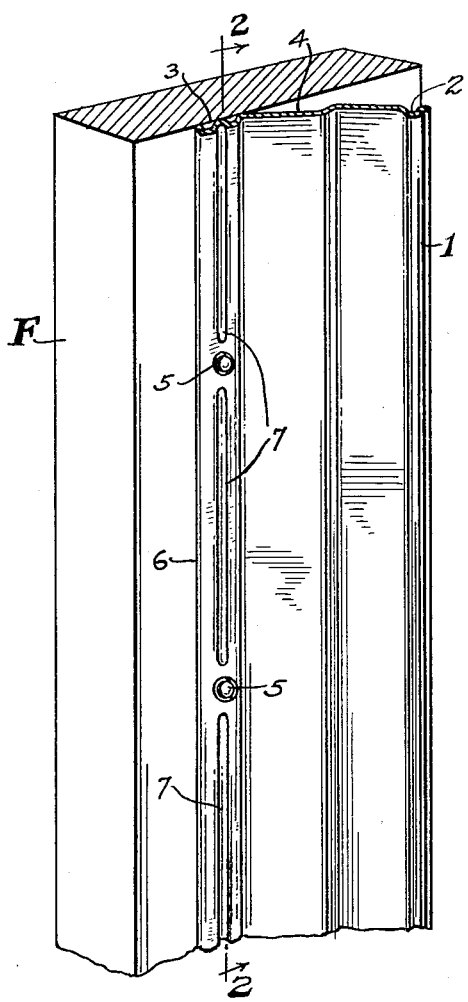
Figure 1 is a fragmentary perspective view of the improved weather strip attached to a frame member.

Referring to the drawing: 1 indicates generally a metal weather strip of the type contemplated having a marginal contacting face 2, a marginal attaching part 3 and an intermediate resilient part 4.

Weather strip of this type is regularly attached to a frame member F by means of spaced brads 5 driven through the marginal attachment part 3 at spaced intervals.

Figures 2, 3:
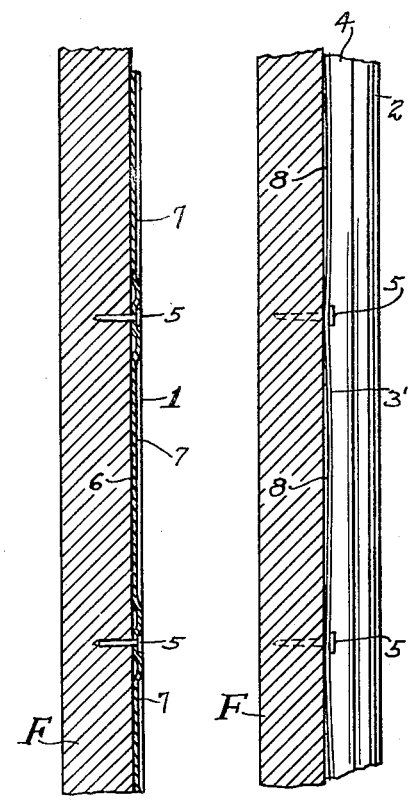
Figure 2 is a longitudinal cross section taken on line 2—2 of Figure 1.
Figure 3 is an edge elevation of a weather strip not provided with the present invention, illustrating same flexed with the parts intermediate the brads bowed to clearly indicate the problem which has been substantially solved by the present invention.

In weather strip of this character as previously in use and as illustrated in Figure 3, the flexing of the intermediate spring part 4 by the pressure of a sash against the contact face 2 tends to bow the marginal attachment part 3', intermediate brads 5 as indicated at 8.

To avoid this bowing of the marginal attachment part it has been found that the provision of a plurality of spaced embossed areas 7 intermediate the attachment brads stiffens this attachment area 3 to prevent this torsional bending of the weather strip and results in the marginal attachment part remaining snugly in contact with the frame member throughout as illustrated in Figure 2 even when the weather strip is most severely flexed.

Where the marginal attachment area 3 is formed convex with marginal flanges 6, as illustrated the intermediate embossments 7 may be formed by depressing the metal as illustrated or alternatively where the marginal attachment part 3 is flat, these marginal embossments may obviously be pressed outwardly, the object being to have the marginal attachment part formed with a somewhat flat face adapted to contact the frame member, so far as possible, consistent with the intermediate embossments specified.

Various modifications in the size, number and shape of the embossments will readily suggest themselves to those skilled in the art but within the scope of the present invention as claimed.

Having thus fully described my invention, I claim:

1. A sheet metal weather strip having an edge part extending lengthwise of the strip and adapted to be secured by spaced apart brads driven therethrough to a frame member, said part having a depression formed lengthwise thereof to hold said part rigid between securing brads.

2. A sheet metal weather strip having an edge part extending lengthwise of the strip and adapted to be secured by spaced apart brads driven therethrough to a frame member, said part being of inverted U-shape in cross section and having a depression formed lengthwise and centrally thereof to hold said part rigid between securing brads.

LOUIS A. MACKLANBURG.